April 10, 1934.   H. G. E. ROTH   1,953,977
AIRCRAFT
Filed March 2, 1932   2 Sheets-Sheet 1
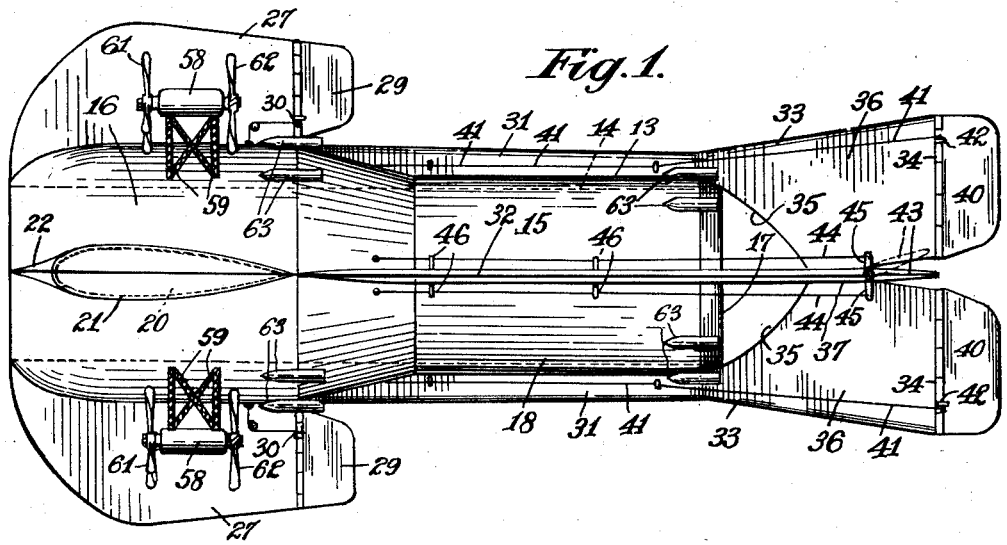
Fig.1.
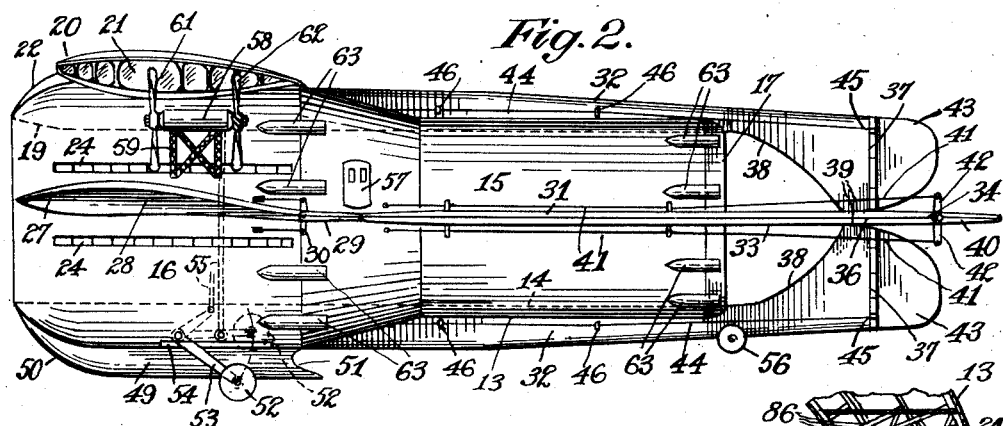
Fig.2.
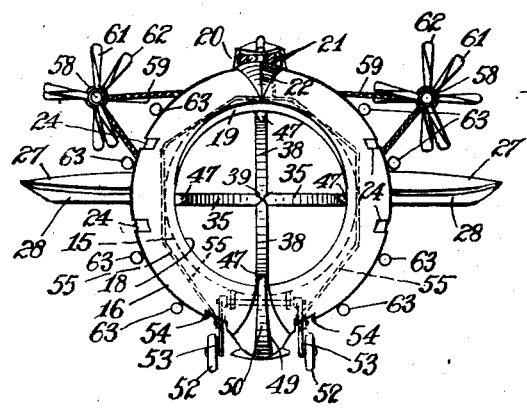
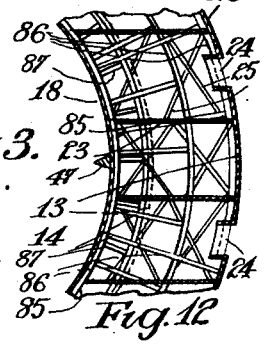
Fig.3.
Fig.12.
Inventor
Hans G. E. Roth
By John A. Seifert
Attorney April 10, 1934. H. G. E. ROTH 1,953,977
AIRCRAFT
Filed March 2, 1932 2 Sheets-Sheet 2
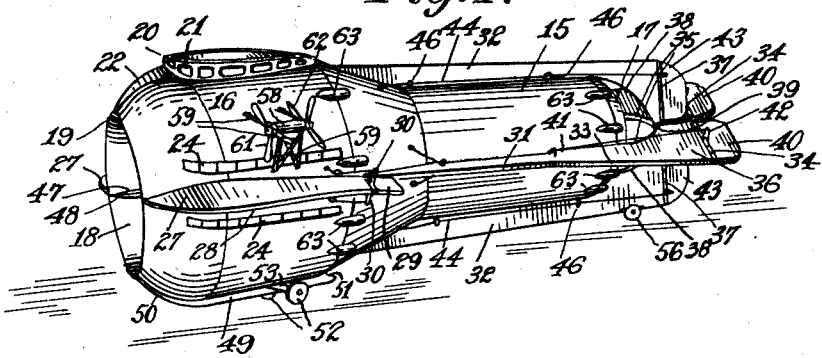
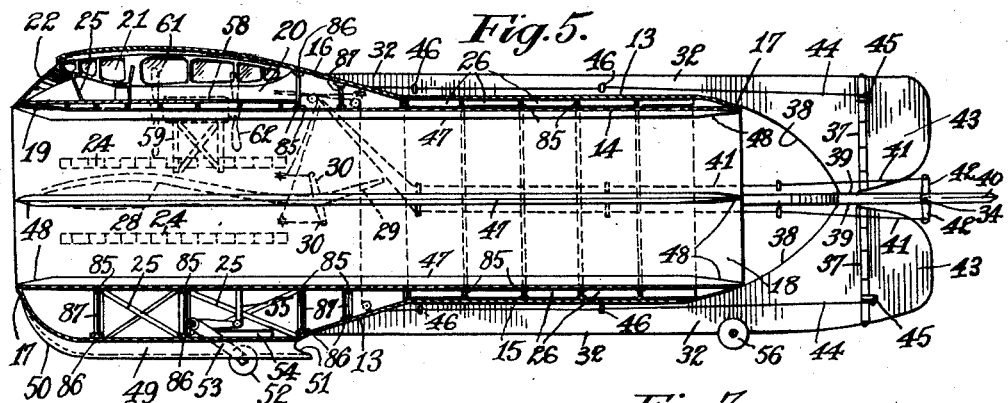
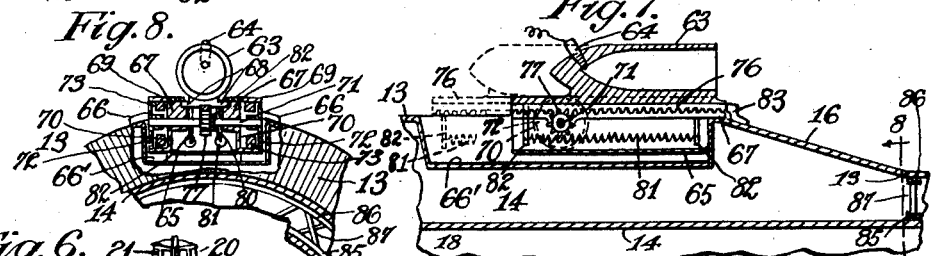
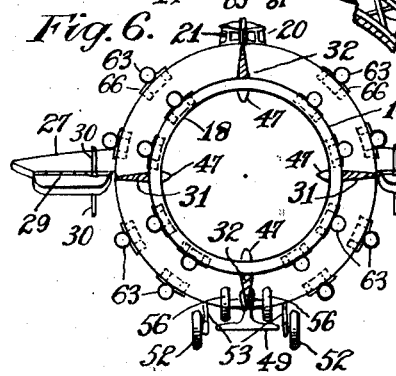
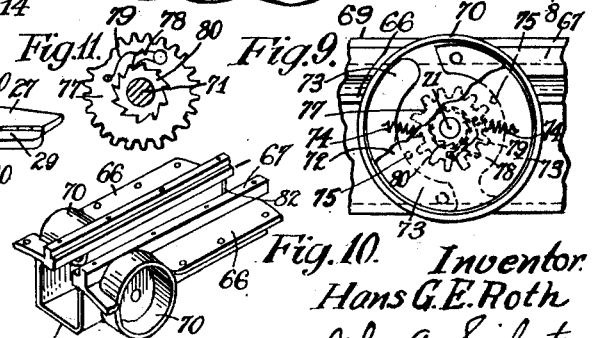
Inventor
Hans G. E. Roth
By John A. Seifert
Attorney Patented Apr. 10, 1934

1,953,977

UNITED STATES PATENT OFFICE 1,953,977

AIRCRAFT

Hans G. E. Roth, New Rochelle, N. Y.

Application March 2, 1932, Serial No. 596,244

19 Claims. (Cl. 244—18)

This invention relates to aircraft of the heavier-than-air type having a cylindrical body and a uniform passage centrally therethrough with a minimum amount of exteriorly supporting surfaces and longitudinal stabilizing fins extending exteriorly of the body from an enlarged front end section containing the pilot and passenger carrying cabins whereby a maximum load may be transported with the greatest safety in flight, and it is an object of the invention to provide an improved constructed and arranged aeroplane whereby there may be transported a load of maximum weight with a minimum amount of power.

Another object of the invention is to provide an aeroplane of such structure as to maintain the aeroplane in equilibrium and effect automatic stabilizing in taking off and landing, and prevent the aeroplane from going into a tail spin as well as preventing side slipping while in flight.

Another object of the invention is to arrange the body with stream lines of novel design that will reduce wind resistance to a minimum without affecting the stability of the aeroplane.

A further object of the invention is to provide substantially the same amount of supporting plane surface at the rear of the aeroplane as at the front to assure stability without substantially increasing wind resistance.

A still further object of the invention is to provide a pontoon integral and stream lined with the front end of the body and landing gear retractible within the body to reduce head resistance.

It is another object of the invention to provide combined motive means exteriorly of the body comprising twin propellers of the tractor and pusher type, and a series of successively actuated rocket devices to assure an even and also emergency propulsion means.

Another object of the invention is to provide novel mounting means for rocket propelling devices to limt the recoil movement of said devices.

Another object of the invention is to provide a system of controls which may be operated from one control cabin.

A still further object of the invention is to provide fins extending longitudinally of the body within the passage to prevent a whirling motion of the air stream passing therethrough without offering a substantial resistance to the air, and also have a stabilizing effect.

The embodiment of the invention comprises a cylindrical body having a uniform passage centrally therethrough and an exterior globular section at the front end arranged with a control cabin in the uppermost portion and arranged with passenger carrying cabins in the sides of the body with the remaining section of the body of tubular form extending rearwardly of and of less exterior diameter than the globular section and having a series of fuel reservoirs mounted therein to supply motive means comprising internal combustion motors mounted on the globular section adapted to actuate twin propellers of the pull and pusher type, and a series of successively operated rocket devices slidably mounted on the rear portions of the globular and tubular sections. The aeroplane is stabilized in flight by supporting planes extending laterally from the globular section having ailerons on the rear edges actuated from the control cabin, and fins extending in horizontal and vertical directions from and longitudinally of the exterior of the tubular section with the free ends converging and connected beyond the rear end of the body and having rudders thereon adjustable from the control cabin. Longitudinal fins are extended into the passage in opposed relation to the exterior fins for preventing a whirling or rolling motion to be imparted to the aeroplane, and a retractible landing gear is provided for in the under surface of the body on opposite sides of a pontoon integral with the body and adapted to be operated from the control cabin.

In the drawings accompanying and forming a part of this application Figure 1 is a view looking at the top of the aeroplane.

Figure 2 is a side elevation looking at the bottom of Figure 1.

Figure 3 is a front view looking at the left of Figure 2.

Figure 4 is a perspective view of the aeroplane.

Figure 5 is a sectional view on the longitudinal axis of the aeroplane showing the interior arrangement of parts and the supporting structure therefor.

Figure 6 is a rear end view looking at the right of Figure 2 with the converging ends of the exterior fins broken away.

Figure 7 is a sectional view, on an enlarged scale, of a rocket device showing the sliding mounting and the means to control the recoil movement thereof.

Figure 8 is a sectional view taken on the line 8—8 of Figure 7 looking in the direction of the arrow.

Figure 9 is a view of the means to control the recoil movement of the rocket devices.

Figure 10 is a perspective view of the mounting for slidably supporting the rocket devices.

Figure 11 is a view of an overriding clutch mechanism for connecting the rocket devices with the recoil control means during the recoil movement of the devices; and Figure 12 is a fragmentary sectional view of the globular section of the aeroplane body showing the arrangement of the passenger cabins in one side of the body.

In carrying out the invention there is provided a cylindrical body constructed of a pair of spaced walls 13, 14 of sheet material of high tensile strength and light weight, with a section of the walls at the rear of the body extending parallelly of each other to form a tubular section 15 and the outer wall 13 diverging from the inner wall 14 in a straight oblique plane from the tubular section and leading in an arcuate direction toward the front end of the body to form a globular section 16 at the front end of the body with the opposite ends of said outer wall converging in an arc or curve toward and connected by welding or other suitable manner, to the ends of the inner wall 14, as at 17 in Figure 5, to form a hollow body. The aerodynamic design of the cylindrical portion 15 and globular portion 16 and the diverging portion of wall 13, or the cylindrical fuselage, is such as to create an uplift or cause the air to exert a lifting force thereon by the forward movement of the body through the air. The inner wall 14 extends for the entire length of the body in a straight plane forming a passage 18 of uniform diameter through the body whereby the head resistance of the aeroplane is greatly reduced and the stability thereof increased by inducing a flow of air through the passage and in an upward direction against the upper portion of the inner wall 14 to add buoyancy to the areoplane in flight. To prevent retarding of the aeroplane in flight the outer edge at the upper front half of the passage 18 is arranged with a crescent shaped flaring portion 19 by inclining or converging the inner wall 14 in an arcuate direction and progressively increasing in width upwardly from the transverse axis and opposite sides of the body, as shown in Figures 2 and 3. The walls 13 and 14 are supported and separated from each other by a series of structural ring members 85 encircling the inner wall 14 and a corresponding series of ring members 86 extending about the inner surface of exterior wall 13, and said rings being spaced apart by truss and brace members 87.

The space between the walls of the upper portion of the globular front section 16 is arranged as a pilot and control cabin 20, Figure 5, having a glass enclosed portion 21 projecting upwardly from the intermediate portion of said globular section to facilitate observation and control of the aeroplane. The roof of said enclosed portion extends longitudinally and transversely and symmetrical in the arcs of the curvatures of the globular section and is provided with a V-shaped cowling 22 tapering from the front of the enclosed portion to the front edge of the body, as shown in Figures 1, 2 and 3, to effect stream lining of the exterior of the cabin. The floor of the cabin 20 is supported by the supporting structure of the inner wall 14, as shown in Figure 5. At the opposite sides of the body between the walls of the globular section there are arranged superposed passenger carrying cabins the flooring 23 of which cabins as well as the ceiling of the upper cabin extend between and are supported by the supports of the walls, as shown in Figure 12. Each passenger cabin has a series of windows 24 in the outer wall extending longitudinally of the globular section. The walls 13 and 14 of the globular section are separated and supported from each other by additional brace and truss members, as shown at 25 in Figure 5, and the lower portion of the space between the walls of the globular section may be utilized as storage or ballast space. The cabins are entered from the exterior of the aeroplane through an opening closed by a door 57 arranged in the tapering portion at the rear of the globular section, as shown in Figure 2, and can readily be reached from the ground by a ladder or other suitable means.

In the uniform space between the walls of the tubular section 15 there is mounted a series of ring shaped containers or tanks 26, as shown in Figure 5, for the storage of suitable fuel for the motive means for propelling the aeroplane, hereinafter described, and the containers may be in communication with each other if desired.

The aeroplane is controlled and sustained in the air by supporting surfaces comprising planes or wings 27 fixed to and extending laterally from the globular section 16 between the rows of windows 24 with the leading or forward edges extending diametrically opposite from the inner wall of the passage 18 in an arcuate outward and rearward direction similar to the curvature at the front end of the globular section and merging with the outer edges which converge rearwardly toward the body of the aeroplane and terminate in straight transverse rear edges leading to the body, and the planes being of greater length than width, as clearly shown in Figure 1, for the purpose of maintaining the stream line effect of the globular section 16 and reduce air resistance. The planes 27 from the leading edge along the longitudinal axis are arranged of concavo-convex form gradually merging into a convexo-concave portion at the rear and extend in an arcuate upward curved direction outwardly from the body with the thickness of the planes tapering from the body toward the outer ends and from the leading to the rear edges, as shown at 28 in Figure 2, to provide air supporting surfaces with stream line effect. To control lateral balancing and the direction of travel of the aeroplane and impart banking or tilting movement thereto ailerons 29 are pivotally mounted on the rear transverse edges of the planes 27 and actuated from the control cabin by the usual actuating lever through cable and lever connections, as shown at 30 in Figure 5.

To maintain the aeroplane on an even keel fins 31 are secured to and extended laterally and diametrically from the opposite sides of the outer wall of the tubular section 15 and parallelly of the axis of the body from the highest intermediate portion of the globular section of the body and beyond the rear end of the tubular section 15 with the cross section of the fins tapering outwardly from the body of the aeroplane, as shown in Figure 6, and said extending portions being of increased width. Fins 32 similar in structure and mounting of the fins 31 extend diametrically opposite from the upper and lower portions of the tubular section 15 in the vertical axis of the body whereby movement of the aeroplane is stabilized on the horizontal and vertical axes and rolling of the aeroplane about its longitudinal axis is prevented. The outer edge of the rear end portions of the fins 31 projecting beyond the tubular section diverge from said tubular section, as at 33 in Figure 1, and terminate in straight transverse edges 34, the inner edges converging in an arcuate path toward each other and merge with straight edge portions extending parallel of the longitudinal axis of the body and in spaced relation to each other, forming an arch shaped space with said end of the body, as at 35 in Figure 1, and thereby forming a pair of horizontal tail planes 36 to support the rear end portion of the aeroplane. To further stabilize the body the vertical fins 32 extend rearwardly of the tubular body portion 15 and terminate in transverse edges 37 extending perpendicularly to the opposite surfaces of the horizontal tail planes 36 at a point intermediate the arched space 35 and the rear edges 34 thereof, as shown in Figures 1 and 2, the inner edges extending in an arcuate path toward each other having radii greater than the arcs of the arch 35, as at 38, and joining the horizontal tail planes 36 adjacent the rear edges 37 with interposing solid portions connected to the opposite surfaces of the horizontal tail planes 36, as shown at 39 in Figures 2 and 5. The flow of air passing through the passage 18 of the body of the aeroplane will spread outwardly upon leaving the rear of the passage into the conical space formed by the arcuate edges 35 and 38 of the tail planes and into forceful impingement with the surfaces of said tail planes whereby a constant supporting force is applied to the tail planes and the stability of the rear end portion of the aeroplane is assured.

To control the ascending and descending movements as well as the banking movement of the aeroplane a pair of elevators 40 are provided for use in conjunction with the ailerons 29, said elevators being in the form of planes pivotally mounted at the rear ends 34 of the horizontal tail portions 36 of the fins 31 and adapted to be actuated independent of each other from the control cabin 20 by the usual manipulating levers through cables 41 movably supported and extended along the horizontal fins 31 from arms 42 fixed to and projecting from the upper and lower surfaces of the elevators to the manipulating levers in the cabin. The aeroplane is steered in a horizontal plane by a pair of rudders 43 pivotally mounted at the rear ends 37 of the vertical tail portions of the fins 32 in spaced relation to the horizontal tail portions 36 of fins 31 with the rear ends terminating at the ends 34 of said tail portions 36, as shown in Figures 2 and 5. The rudders are actuated from the cabin 20 by cables 44 connected to arms 45 fixed to and extending laterally from the opposite surfaces of the rudders 43 and adjustably supported by brackets 46 to extend along the vertical fins 32 to the usual manipulating levers mounted in the control cabin. It will readily be seen that the elevators 40 and rudders 43 may be actuated simultaneously and in conjunction with the ailerons 29 to readily stabilize and control the direction of travel of the aeroplane.

The flow of the air through the passage 18 when the aeroplane is in flight traveling at a high rate of speed may cause circuitous currents or eddies of air within the longitudinal passage which will tend to impart a rolling or whirling motion to the aeroplane hindering the manipulation of the same and cause the pilot to lose control. This disadvantage is overcome by fins 47 of triangular shape in cross section projecting with the apex foremost from the inner wall 14 into the passage in alinement with the exterior fins 31 and 32. The fins 47 extend through the passage for the entire length of the body with the ends of the fins tapering to the opposite ends of the body, as at 48 in Figure 5, to reduce the wind resistance.

The aeroplane is adapted to be supported when not in flight from either the ground or a body of water. For supporting the aeroplane on water a pontoon is arranged at the lower portion of the globular section 16, comprising a bulbous portion 49 projecting from and integral with the bottom portion of the outer wall 13 of the globular section and extending parallelly of the longitudinal axis for the length of said section from the entrance of the passage 18, said pontoon at the forward end having a tapering or arcuate stream lined face, as at 50, and at the opposite end terminating adjacent the rear portion of the globular section in an arcuate cut back portion 51 to prevent the creating of eddying air currents at the rear thereof known as "back-wash". As a substantial portion of the globular section is supported on the water and in which section most of the weight is carried it is not necessary to provide supporting means at the rear of the body. To support the aeroplane on the ground a pair of traction wheels 52 are rotatably supported by an arm of levers 53 pivotally mounted to have movement into and out of recesses 54 extended into the storage space at the bottom of the globular section at opposite sides of the pontoon, the other arms of the levers being pivotally connected to rods 55 extended through the globular body and connected to manipulating levers mounted in the control cabin adapted to actuate the rods to position and rigidly support the wheels exteriorly of the recesses 54 with peripheral portions thereof extending below the undersurface of the pontoon to engage the ground or within the recess. When the aeroplane is to be landed on water or is in flight the wheels are adjusted to position within the recesses 54 to provide for a smooth water landing and reduce air resistance in flight. In supporting the aeroplane on the ground the supporting surface of the wheels 52 is small in comparison with the size of the body of the aeroplane and the tail portion thereof will therefore engage and drag on the ground. To overcome this disadvantage the tail portion is supported by a pair of traction wheels 56 mounted on opposite sides of the lower vertical fin 32 with peripheral portions extending below the lower edge of the fin. The stationary mounting of the wheels 56 will not offer any undue wind resistance due to the position of the wheels relative to the globular section which will divert the greater part of the air in a direction away from the rear of the aeroplane.

The aeroplane is propelled in flight by two independent power means whereby the safety factor thereof is greatly increased. One of these power means comprises two motors 58 of the internal combustion type operatively connected to the fuel supply tanks 26 and supported on opposite sides of the globular section 16 above the planes 27 by suitable means, shown in a conventional manner at 59. The aeroplane is propelled by blade propellers 61, 62 mounted on the opposite ends of the power shafts of each motor, the propellers 61 at the forward ends having three blades and the propellers 62 at the rear showing four blades, the front propellers 61 imparting a pulling force and the rear propellers 62 effecting a pushing force. It is understood the number of blades of either set of propellers may be varied depending upon the size and weight of the aeroplane.

The other power means consists of a series of rocket devices spaced about the globular section 16 at the juncture of the main portion with the rear tapering portion thereof, as well as about the tubular section 15 adjacent the rear end. In the present instance there is shown four of the devices on each side of the globular and tubular sections of the aeroplane body but any number may be employed at appropriate points on the body depending upon the size and weight of the aeroplane. These rocket propelling devices comprise a cylindrical shell 63 having one end closed to form a chamber and mounted with the opening to the rear of the aeroplane, and connected to the fuel reservoirs 26 containing suitable combustible fluids by appropriate feed lines to deliver said fluid in desired quantity at predetermined intervals to the chambers of the different rocket devices. The delivered charge of combustible fluid is ignited by an electric spark of a sparking device 64 mounted in the closed end of the shell, Figure 7, and actuated in synchronism with the feeding of the fluid, the igniting and combustion of the fluid causing expansion and expelling the same under pressure from the shell chambers and exerting a force on the end wall of the shell chamber and a forward propelling force on the aeroplane. The propulsion of the aeroplane is uniform and continuous by alternately firing the rocket devices in the front and rear series by connecting the sparking devices in circuit with an electric current interrupter or distributer of the usual structure used in firing spark plugs of an internal combustion engine and actuated by the propeller motors or a separate motor used to operate suction or pumping means to periodically deliver the combustible fluid to the rocket devices alternately with the firing of the rocket devices. To absorb the shock of the expelling force of the products of combustion from the shells 63 they are slidably mounted and means is provided to absorb the recoil of the shells and limit said recoil movement and thereby prevent damage to the body of the aeroplane. For this purpose the shells are slidably mounted on the outer wall of the body by a channel shaped casing 65 (Figure 10) having the upper edges of the opposite walls thereof flanged, as at 66, to engage the outer walls of the aeroplane body and mount the casings within recessed portion 66' arranged in the space between the body walls 13 and 14, as shown in Figure 8. Parallel slideways 67 are extended along the upper edges of the side walls of the casings in overhanging relation to the channel for the slidable engagement of supporting flanges 68 extending laterally from opposite sides of a base portion of the cylindrical shells 63 and the shells are retained on the slideways by gib plates 69 releasably secured on the vertically extending wall portions of the slideways to extend over the shell flanges 68, as shown in Figure 8. The recoil of the rocket shells 63 is absorbed and the recoil movement limited by braking mechanism operated through centrifugal force imparted by the recoil movement and comprising drums 70 arranged at outer sides of the side walls of the channel casing 65 in alinement with each other having perforations centrally through the bottom walls for rotatably supporting the ends of a shaft 71 extending transversely of the channel casing. Disks 72 of a diameter equal to the interior diameter of the drums are fixedly mounted on the ends of the shaft 71 within the drums, and arcuate shaped members 73 pivotally mounted at one end diametrically opposite to each other on the disks to extend parallelly and adjacent opposite portions of the peripheries of the disks to serve as brake shoes to be impinged against the sides of the drums upon the rotation of the disks in an anti-clockwise direction imparted thereto by the recoil movement of the rocket shell. The shoes are normally positioned away from the sides of the drum by springs 74 yieldingly urging the shoes to abut pins 75 projecting from the disks, as shown in Figure 9. The recoil movement of the rocket shells is imparted to the disks to rotate the disks in an anti-clockwise direction by rack bars 76 fixed to the center of the base of the shells and meshing with pinions 77 loosely mounted on the shafts 71 and adapted to be coupled to the shafts when actuated in an anti-clockwise direction to impart braking movement to the shoes 73 by an overriding clutch mechanism shown as comprising pawls 78 pivotally carried by the pinions and yieldingly urged by springs 79 mounted on the pinion to engage the teeth of ratchet wheels 80 fixedly mounted on the shafts 71 to rotate the shafts during the recoil movement of the rocket shells and ride over the teeth of the ratchet wheels during the return movement of said shells to normal position, as shown in full lines in Figure 7, and thereby impart no movement to the shafts. The rocket shells are yieldingly urged to normal position by springs 81 fixed at the opposite ends to posts 82 extended from the base portion of the rocket shells and an overhanging track portion 67 of the casings 65, as shown in Figure 7, and the forward movement of the shells is limited by abutments 83 projecting from the outer wall 13 of the body of the aeroplane.

It will be obvious that various modifications may be made in construction and arrangement of parts without departing from the scope of the invention, and that portions of the invention may be used without others and come within the scope of the invention.

Having thus described my invention, I claim:

1. In an aeroplane, a hollow cylindrical body having a passage of uniform diameter longitudinally therethrough and an exterior wall portion of enlarged diameter at the front end, planes extending laterally from the enlarged end portion, fins extending in horizontal and vertical planes from the enlarged end portion longitudinally of the portion of the body of smaller diameter, and propelling means mounted relative to the enlarged end portion and on the portion of smaller diameter of the body adjacent the rear end thereof.

2. In an aeroplane, a hollow cylindrical body having an inner wall of uniform diameter and an enlarged annular outer wall portion at the front end and an intermediate portion tapering from said enlarged wall portion to the outer wall of the body of smaller diameter, cabins arranged between the walls of the enlarged end portion of the body, planes extending laterally from the enlarged end portion, and propelling means supported exteriorly of said enlarged outer wall portion.

3. In an aeroplane, a hollow cylindrical body having a passage of uniform diameter therethrough and an enlarged annular outer wall portion at the front end tapering toward the outer wall of the rear portion of the body of smaller diameter, horizontal and vertical fins extending longitudinally of the outer wall and beyond the rear end of the body of smaller diameter, with the extending ends of the fins converging toward and connected to each other and arranged to form a conical space between the rear end of the body and the fins.

4. In an aeroplane as claimed in claim 3, wherein the connected ends of the horizontal fins extend beyond the rear of the vertical fins, and rudders adjustably mounted on the rear edges of the extended ends of the fins for directing the travel of the aeroplane.

5. In an aeroplane, a hollow cylindrical body with the outer wall spaced variable distances from the inner wall and the space of greatest dimension being at the forward end of the body and the inner wall providing a passage of uniform diameter longitudinally through the body, a control cabin in the upper portion of the space of greatest dimension of the body, passenger carrying cabins in said space of greatest dimension at the opposite sides of the body, planes extending laterally from the outer wall of the body adjacent the passenger cabins, vertical and horizontal control rudders at the rear of the body, and propelling means supported exteriorly of the outer wall of the body.

6. An aeroplane as claimed in claim 5, wherein the walls of the body converge toward and meet at the opposite ends of the body.

7. An aeroplane as claimed in claim 5, wherein the front end portion of the inner wall progressively flares in an upward direction from the horizontal transverse axis of the body to reduce wind resistance.

8. In an aeroplane as claimed in claim 5 wherein the spaced walls extend parallelly for a predetermined length of the rear end of the body, and fuel reservoirs mounted between said parallel walls and adapted to be connected to the propelling means.

9. In an aeroplane, a hollow cylindrical body having a passage of uniform diameter therethrough, planes extending laterally from a front end section of the body and having ailerons adjustably mounted at the rear ends thereof, and diametrically opposite horizontal and vertical fins extending from the outer surface and longitudinally of the portion of the body at the rear of the planes with portions of the fins projecting beyond the rear end of the body and having rudders adjustably mounted thereon, and propelling means supported exteriorly of the outer wall and intermediate the ends of the body.

10. In an aeroplane, a hollow cylindrical body having a passage of uniform diameter therethrough, planes extending laterally from a front end section of the body and having ailerons adjustably mounted at the rear ends thereof, diametrically opposite horizontal and vertical fins extending from the outer surface and longitudinally of the portion of the body at the rear of the planes with portions of the fins projecting beyond the rear end of the body and having rudders adjustably mounted thereon, and fins extending from the interior wall of the body longitudinally of and into the passage and in alinement with the fins extending from the outer surface of the body.

11. In an aeroplane, a hollow cylindrical body having a front end section of globular form and a section of uniform diameter extending from the rear of said globular end section and having a passage of uniform diameter longitudinally through the body, cabins arranged between the walls of the globular section, fuel reservoirs mounted between the walls of the section of uniform diameter, planes extending laterally from the globular section having ailerons adjustably mounted at the rear ends thereof, rudders adjustably mounted at the rear of the section of uniform diameter and extending in planes horizontally and vertically through the axes of the body, means connected to the ailerons and rudders and actuated in a cabin to direct the travel of the aeroplane, and propelling means supported on the exterior walls of the globular and uniform diameter sections and connected to the fuel reservoirs.

12. In an aeroplane, a cylindrical body having a front end section of globular form and a section of uniform exterior diameter extending from the rear of said globular section and having a passage of uniform diameter extending longitudinally through the body, planes extending laterally from the globular section, a plane extending from the rear end of the body and having a recess in the marginal portion opposite the end of the body, and propelling means carried by the globular and uniform sections.

13. In an aeroplane, a hollow cylindrical body having a front end section of globular form and a section of uniform diameter extending from the rear of the globular section, planes extending laterally from the globular section with the leading edge extending in an arcuate direction outwardly from the front end and laterally of the body and having a curvature similar to the curvature of the globular section, diametrical and vertical fins extending longitudinally and beyond the end of the section of the body of uniform diameter, and the horizontal fins extending as continuations of the planes with the outer edge of said horizontal fins diverging from the end of the body, and horizontal and vertical rudders adjustably connected to the ends of said fins.

14. In an aeroplane, a hollow cylindrical body having a front end section of globular shape and a section of uniform diameter extending from the rear of the globular section with a passage longitudinally through the body, a control cabin in the upper portion of the globular section, fuel reservoirs supported by the section of uniform diameter, planes extending laterally from the globular section, a series of cylinders slidably mounted on each section of the body adapted to receive a charge of combustible material from the fuel reservoirs, and firing means mounted in the cylinders and actuated from the control cabin to alternately ignite the charge in the cylinders to propel the aeroplane.

15. In an aeroplane, a hollow cylindrical body having a front end section of globular shape and a section of uniform diameter extending from the rear of the globular section with a passage longitudinally through the body, a control cabin in the upper portion of the globular section, fuel reservoirs supported by the section of uniform diameter, planes extending laterally from the globular section, a series of cylinders slidably mounted on each section of the body adapted to receive a charge of combustible material from the fuel reservoirs, firing means mounted in the cylinders and actuated from the control cabin to alternately ignite the charge in the cylinders to propel the aeroplane, and means to absorb and limit the recoil movement of the cylinders after the discharge thereof.

16. An aeroplane as claimed in claim 15, wherein the means to absorb and limit the recoil of the cylinders comprises drums fixed to the mounting of the cylinders, a shaft rotatably supported centrally of the drums, disks fixed to the shaft within the drums, overriding clutch mechanism mounted on the shaft and actuated by the recoil movement of the cylinders to impart rotary movement to the shaft, brake shoes carried by the disks to engage the sides of the drums by the rotation of the shaft to retard and stop the recoil movement of the cylinders, and means to yieldingly urge the cylinders to normal position.

17. In an aeroplane, a hollow cylindrical body having a passage of uniform diameter therethrough, planes extending laterally from the body adjacent the forward end thereof, a cabin in the front end section of the body above the planes, fuel reservoirs in a section of the body to the rear of the cabin, a series of members mounted in recesses spaced about the exterior of the body and arranged with parallel guideways, cylinders slidably mounted in the guideways exteriorly of the body adapted to receive periodic charges of combustible material from the fuel reservoirs, firing means mounted in the cylinders and actuated from the cabin to ignite the charge in the cylinders and propel the aeroplane by the expensive forces of the ignited charges, opposed drums fixed to the sides of the cylinder mounting members in the recesses, a shaft rotatably supported centrally of the drums, a pinion loosely mounted on the shaft, a toothed rack fixed to the cylinders to engage the pinion, pawl and ratchet-wheel mechanism carried by the shaft and pinion and adapted to connect the pinion and rack to the shaft during the recoil movement of the cylinders, disks fixedly mounted on the shaft within the drums, and arcuate shoes pivotally mounted at one end on the disks to engage the drums upon the rotation of the shaft by the recoil movement of the cylinders and thereby retard and stop the recoil movement of the cylinders, and springs to urge the cylinders to normal position.

18. In an aeroplane, a hollow cylindrical body having two sections of different cross sectional area and the section of greatest cross sectional area at the forward end and the opening through the body being of uniform diameter throughout, fixed planes extending oppositely from the portion of the body of greatest area, vertical and horizontal fins extending laterally and diametrically opposite from the outer wall of the body and beyond the end of the portion of least cross sectional area, with the portions of the fins extending beyond the body converging toward each other and the marginal portions opposed to the end of the body spaced therefrom, ailerons connected to the rear end of the planes, and rudders connected to the ends of the converging portions of the fins.

19. In an aeroplane, a cylindrical body of different cross section area at the opposite ends having parallel exterior wall portions and an intermediate tapering portion connecting the parallel wall portions, planes extending laterally from the exterior of the body, and propelling means supported on the exterior of the body.

HANS G. E. ROTH.